United States Patent

Moreau

Patent Number: 6,047,565
Date of Patent: Apr. 11, 2000

[54] METHOD AND DEVICE FOR REDUCING THE $NO_X$ EMISSION IN A GLASS FURNACE

[75] Inventor: Raymond Moreau, Croissy sur Seine, France

[73] Assignee: Saint Gobain Vitrage, Courbevoie, France

[21] Appl. No.: 09/029,736

[22] PCT Filed: Jul. 9, 1997

[86] PCT No.: PCT/FR97/01244

§ 371 Date: Jun. 3, 1998

§ 102(e) Date: Jun. 3, 1998

[87] PCT Pub. No.: WO98/02386

PCT Pub. Date: Jan. 22, 1998

[30] Foreign Application Priority Data

Jul. 11, 1996 [FR] France .................... 96 08663

[51] Int. Cl.[7] .................................... C03B 5/435
[52] U.S. Cl. .............. 65/32.1; 65/134.4; 65/134.6; 432/159; 432/195; 432/196
[58] Field of Search .................. 65/32.1, 134.4, 65/134.6; 432/159, 196, 195

[56] References Cited

U.S. PATENT DOCUMENTS

| | | | |
|---|---|---|---|
| 3,353,941 | 11/1967 | Hanks et al. | 65/32.5 |
| 4,599,100 | 7/1986 | Demarest, Jr. | 65/134.4 |
| 4,874,311 | 10/1989 | Gitman | 432/13 |
| 4,911,744 | 3/1990 | Petersson et al. | 65/134.4 |
| 5,147,438 | 9/1992 | Castelain et al. | 65/134.4 |
| 5,346,524 | 9/1994 | Shamp et al. | 65/134.4 |
| 5,628,809 | 5/1997 | Kobayashi | 65/134.4 |
| 5,643,348 | 7/1997 | Shamp et al. | 65/134.4 |
| 5,755,846 | 5/1998 | Wagner | 65/134.4 |

FOREIGN PATENT DOCUMENTS

| | | |
|---|---|---|
| 577881 A1 | 1/1994 | European Pat. Off. |
| 599548 A1 | 6/1994 | European Pat. Off. |
| 640794 A2 | 3/1995 | European Pat. Off. |
| 699634 A2 | 3/1996 | European Pat. Off. |
| 4244068 C1 | 4/1994 | Germany. |

OTHER PUBLICATIONS

Database WPIDS, week 9413, Derwent Information LTD, AN 94–102665, DE 4244068 C1 (RUHRGLAS GMBH), abstract, Apr. 1994.

*Primary Examiner*—Sean Vincent
*Attorney, Agent, or Firm*—Oblon, Spivak, McClelland, Maier & Neustadt, P.C.

[57] ABSTRACT

A method and apparatus involving combustion for melting glass. The fuel and oxidizer of the combustion are both supplied in such a way as to spread out the fuel/oxidant contact over time and to increase the volume of the contact. This limits the temperature peaks and reduces $No_x$ emissions. The invention also relates to the glass furnace which implements the method.

18 Claims, 2 Drawing Sheets

METHOD AND DEVICE FOR REDUCING THE $NO_x$ EMISSION IN A GLASS FURNACE

BACKGROUND OF THE INVENTION

1. Field of the Invention

The invention relates to glassmaking furnaces, in particular the furnaces used in the manufacture of flat glass of the "float" type, and it relates more specifically to a method and a device intended to reduce the emission of $NO_x$ in the gaseous effluents discharged from the furnace.

2. Discussion of the Background

It is a concern of glassmaking furnace manufacturers to limit as much as possible the emissions of $NO_x$ in the combustion smoke, especially because of the fact that the standards are becoming increasingly demanding in this regard. These emissions should therefore be limited to 500 mg/M³ of $NO_x$, a limit which the known methods do not allow to be obtained, or do allow, but to the detriment of their profitability.

The factors which influence the formation of $NO_x$ gases are known. These are essentially the temperature, since their emission increases exponentially above 1300° C., or the excess air, since the $NO_x$ gases depend on the square root of the oxygen concentration, or else the $N_2$ concentration.

A known method consists in causing a reducing agent to act on the gases emitted so that the $NO_x$ gases are converted into nitrogen. This agent may be ammonia, but the drawbacks of storing and handling such a substance are known. It is also possible to use a natural gas as reducing agent, but to the detriment of the consumption of the furnace.

It therefore turns out to be preferable to avoid these methods, and it has already been considered to adopt so-called primary measures, for example by preventing the formation of $NO_x$ within the flame itself, by reducing the excess combustion air. To do this, it was sought to limit the hot air which passes into the regenerator and to eliminate or decrease the inducted-cold-air intakes around the injectors in the unsealed furnace. It is thus possible to decrease the sprayed primary air by increasing the fuel-spraying pressure. For this purpose, it is necessary to provide a continuous control of the excess oxygen in the regenerator chambers and to use suitable fuel injectors. However, the results obtained remain insufficient and do not enable the percentage indicated above to be readily achieved.

Another primary measure consists in acting on the temperature. Thus, attempts may be made to modify the distribution of the fuel in order to reduce the maximum thermal level of the furnace, or to install suitable injectors in order to decrease the momentum of the fuel right to the limit of the appearance of unburnt gases in the discharge flue. It is also possible to use a spraying agent other than air, for example steam, when this is available.

SUMMARY OF THE INVENTION

As these primary measures do not enable the fixed objectives to be achieved, a method and a device have been conceived, according to the present invention, by means of which the resulting effects obtained by each of the known primary methods are combined, that is to say that the invention succeeds in first of all limiting the temperature peaks, while maintaining the length of flame, and in increasing the volume of the flame front in order to reduce the temperatures. Furthermore, staging of the combustion by the fuel and by the oxidizer are provided. Finally, it is advantageous to move towards the use of a flame containing 100% oxygen at the hottest level in the furnace.

SUMMARY OF THE INVENTION

One subject of the present invention therefore consists of a method of combustion for melting glass, in which the fuel and the oxidizer are both fed so as to spread the fuel/oxidizer contact over time and/or to increase the volume of this contact for the purpose, in particular, of limiting the temperature peaks and of reducing the emission of $NO_x$ gases.

The subject of the invention is also a glass-making furnace of the furnace type for manufacturing flat glass, operating, in particular, in reversal mode, which furnace implements the process according to claim 1 and is provided on at least one of its sides with:

- a main oxidizer supply means in the form of an air intake port;
- a main fuel supply means in the form of a plurality of gas or fuel injectors arranged under the air intake port; and
- a means for delaying the contact between the said oxidizer and the said fuel.

In fact, the invention entails various furnace configurations making it possible to delay/retard, or spread over time, the contact between oxidizer and fuel.

According to a first embodiment, the means for delaying the contact between oxidizer and fuel comprises at least one injector for a "buffer" gas which is inert with respect to the combustion, the injector being arranged in the air intake port or in the vicinity of the said port above the injectors of the main fuel supply means.

The "buffer" gas is in particular of the $CO_2$ type. However, it is also possible advantageously to use the combustion gases/gaseous effluents/smoke discharged from the glass furnace and it is thus possible to "recycle", at least in part, by extracting them from the base of the stack, for example.

This gas, chosen therefore so as not to be actively involved in the combustion, is thus injected between the main fuel and oxidizer injection zones in order to "push back" the development of the flame further towards the centre of the furnace, the flame thus being more spread out and wider, and hence giving better temperature homogeneity in the flame, this really being a move closer towards reducing $NO_x$ gases.

According to a second embodiment, the means for delaying the contact between oxidizer and fuel is a secondary fuel supply means in the form of at least one gas or fuel injector arranged in the air intake port or in the vicinity of the said port, above the injectors of the main fuel supply means.

In fact, the invention according to this embodiment is intended to generate the buffer gas "in situ", in the sense that these secondary fuel injectors, having suitable characteristics explained below, will emit a fuel which reacts with the oxygen in the stream of air emanating from the air intake port in a limited manner so as to create a de facto inert blanket of smoke which will temporarily isolate the stream of air from the fuel supplied mainly by the other injectors. Preferably, the secondary injectors are arranged in the side walls of the air intake port or on the approximately vertical wall of a step, in particular a horizontal one, made in the flue bottom, sheltered from the air intake port. These injectors may be arranged either more or less parallel to the "main" injectors, so that the jets of fuel thus emitted by the two types of injectors are approximately parallel or convergent. It is also possible to choose to arrange the "secondary" injectors so that they are more or less perpendicular to the "main" injectors, so that the jets of fuel are always approximately superposed but so that they are also more or less perpendicular, something which may be the case when the injectors are in the step mentioned above.

The fact that the jet of fuel output by the secondary injectors is "sheltered" from the stream of air is advantageous, so as to develop low-momentum flames.

Likewise, the fact that they are perpendicular to the main injectors and, de facto, to the stream of air emanating from the air intake port is a move towards producing low-momentum flames enabling the suitable smoke layer to be created.

It is also preferable, within the same context, for the "main" injectors (those of the main fuel supply means) to project the fuel at a delivery rate and a velocity which are markedly higher than that emanating from the "secondary" injectors. Thus, it is preferred for the velocity of the fuel emanating from the main injectors (for example, 40 to 60 m/s) to be at least three times greater than that of the fuel emanating from the secondary injectors (for example, 2 to 10 m/s).

Likewise, it is preferred for the rate of delivery of fuel output by the secondary injectors to constitute only approximately 5 to 300 of the total rate of delivery of fuel supplying the furnace.

The furnace according to the invention may furthermore comprise a means for increasing the number of oxidizer sources so that the combustion is staged as much as possible, in particular so as to increase the volume of the contact between oxidizer and fuel. This is in the form of a secondary oxidizer supply means chosen from at least one oxygen lance or at least one air intake, an oxygen lance being the simplest solution.

The oxygen lances (or air intakes) must be configured so as to participate in the combustion. It is therefore preferable to locate them in the vicinity of the "main" fuel injectors, in particular closely beneath them, or at the same level. If the main injectors are thus arranged more or less in one plane, in line, it is possible to alternate them with oxygen lances. In this case, in order to obtain the desired combustion staging, it is preferable to adjust the rate of delivery of air from the main air intake port so that the combustion is substoichiometric in terms of oxygen, the oxygen lances (or air intakes) topping up the oxygen content in order to ensure complete combustion of the fuel.

Moreover, the furnace according to the invention may also comprise a means for protecting the surface of the bath of molten glass from contact with a reducing atmosphere, this means being in the form of at least one oxygen lance or of at least one air intake above and in the vicinity of the said surface. To this end, the oxygen lances or air intakes are not really configured for participating in the combustion, contrary to the previous case. It is then preferable for the main oxidizer supply means in the form of an air intake port to be adjusted so as to deliver the oxygen in a stoichiometric amount in order to ensure maximum combustion of the fuel.

In fact, these oxygen lances or air intakes serve to create a permanent oxidizing (non-reducing) environment above the bath of glass in order to prevent it from deteriorating, by means of a simple "blanketing" which requires only a small quantity of oxygen or air, at a low rate of delivery and a relatively high velocity.

Advantageously, the use of these various oxygen or air intakes described above, in order to protect the molten glass, is such that their number increases from the "upstream" part to the "downstream" part of the combustion chamber: thus, it is not absolutely necessary for there to be one of them at an extreme upstream point, in the region for charging the furnace with glass formers, and the number of them may be gradually increased along the combustion chamber. Preferably, one of these oxygen or air intakes is provided in the most "upstream" region of the combustion chamber, where the bath of molten glass is covered with a "blanket" of non-molten glass formers, and they are used only in the most "downstream" region, where the bath of glass is no longer protected by this "blanket", in a distribution which is uniform and symmetrical with respect to the longitudinal axis of the combustion chamber.

Preferably, the invention applies to a furnace operating in reversal mode, with substantially axial symmetry with respect to the longitudinal axis of the furnace, in the distribution of the various gas/oxidizer/fuel supply means described above.

The present invention therefore consists in particular of a device for reducing the $NO_x$ emission in a glassmaking furnace, the combustion chamber of which is fed with fuel and with oxidizer from the side of the furnace, in which device the said furnace is equipped with at least one burner provided with a first series of fuel injectors arranged under the stream of oxidizer air emanating from a side port, as well as with at least one gas injector arranged in the port or in the vicinity of the air intake port, at least one oxygen injection lance being provided under the jet of combustible gas, just above the bath of glass. The rate of delivery of fuel output by the second type of gas injector, in or in the vicinity of the air intake port is about 5 to 30% of the total rate of delivery of fuel.

According to one embodiment of the invention, the burner is provided with at least one and preferably at least two side injectors placed in one or more side walls of the air intake port, in the middle of the stream of air. The injector or injectors is (are) oriented so as to converge towards the axis of the first series of injectors.

As a variant, it (they) is (are) placed on the vertical part of a step in the burner flue, sheltered from the stream of air.

According to another characteristic of the invention, the side injector or injectors located on the vertical step of the burner flue consist of nozzles which can be used to inject a buffer gas. It is also possible, on the same step, to provide buffer-gas injection nozzles in the vicinity of the side fuel injectors so as to be able to combine buffer-gas injection with fuel injection.

BRIEF DESCRIPTION OF THE DRAWINGS

Other characteristics and advantages of the invention will emerge from the description which follows of non-limiting embodiments, in which reference will be made to the appended drawings which represent.

DETAILED DESCRIPTION OF THE PREFERRED EMBODIMENTS

Figure 1:
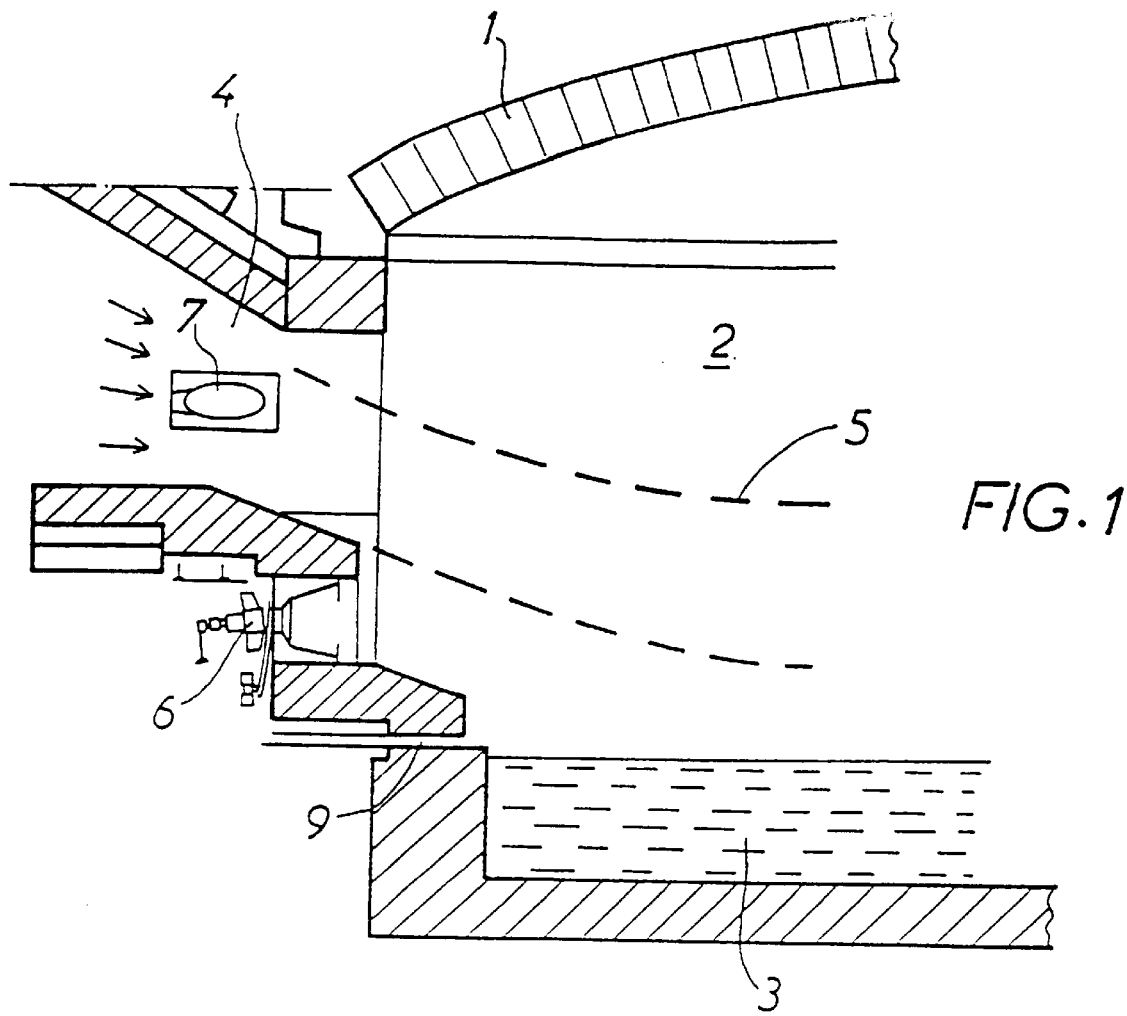
FIG. 1: a partial diagrammatic view, in vertical cross-section, of a glassmaking furnace equipped with its two series of injectors and oxygen injection lances.

FIG. 1 shows diagrammatically a glassmaking furnace 1 with an internal combustion chamber 2 above the bath of glass 3, the chamber being fed with fuel and oxidizer from the side of the furnace.

The furnace is a furnace for manufacturing flat glass of the float type. It should be imagined that it is axially symmetric and equipped with two side regenerators, in a known manner.

The air blown in via the side port 4 creates, inside the furnace, a stream of air portrayed by the dotted lines 5.

Figure 2:
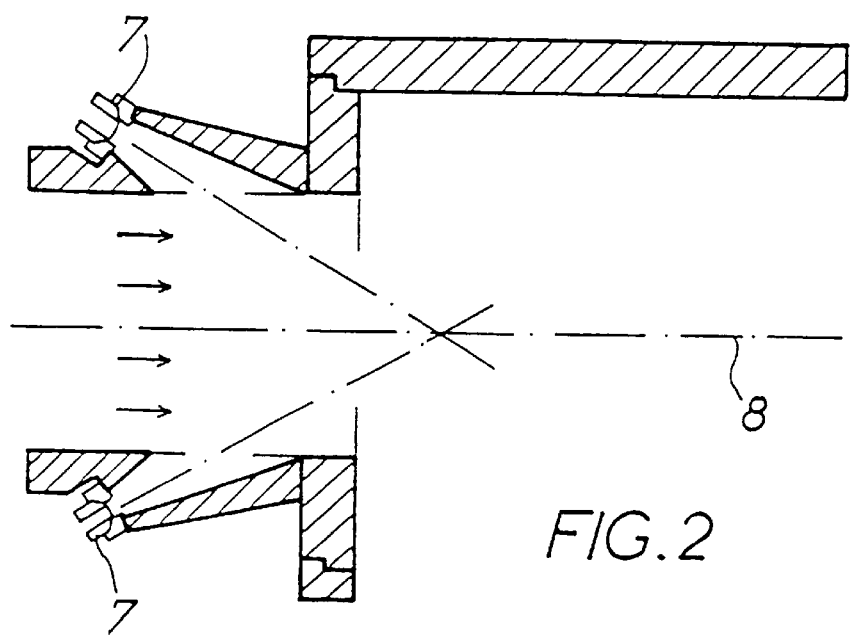
FIG. 2: a partial view, in horizontal cross-section, showing an arrangement of the side injectors.

The furnace is equipped with at least one burner provided with two series of injectors, i.e. gas or fuel injectors 6, arranged under the stream of air, and side gas injectors 7, arranged in the side walls of the air intake port 4, therefore in the middle of the stream of air, and they are oriented so as to converge towards the axis 8 of the first injectors 6, as may be more clearly seen in FIG. 2. Arranged below the injectors 6 are lances 9 which inject oxygen under the jet of combustible gas, the oxygen being injected over the bath of glass 3. FIG. 1 shows the lances in close proximity thereto; however, they may be a little higher than shown.

The injectors 7 emit, via the side walls of the burner, a small fraction of the fuel, of about 5 to 30% of the total delivery. The primary flame therefore develops in the furnace with an excess of air emanating from the port 4. However, its temperature is sufficiently low to minimize the $NO_x$ gases. The smoke from this primary flame is mixed with the residual air before reaching the jet of fuel emanating from the injectors 6 arranged under the stream of air 5. The secondary flame emitted expands into a mixture of air and smoke, which also reduces the $NO_x$ gases: this is the embodiment mentioned above in which the buffer gas is generated "in situ".

In addition, the rate of delivery of oxidizer air arriving via the burner flues is lower than the theoretical rate of delivery necessary; also, the secondary flame is itself deficient in air and therefore locally starved of oxygen and consequently of $NO_x$. The function of the lances 9 which inject oxygen above the bath of glass, at a velocity close to that of the fuel, in relation to the angle of convergence of the fuel output by the injectors 7, is to shift somewhat further into the furnace the region of oxygen/fuel mixing, thereby making it possible to decrease the temperature at the root of the flame, this being a move towards decreasing the $NO_x$ gases. In fact, in this case, the lances 9 are in the immediate vicinity of the glass and create, close to the bath of glass 3, an oxidizing atmosphere, this being particularly necessary for high-quality oxidized glasses, thereby avoiding the effect of too reducing an atmosphere on the tint and refining of the glass. If it is desired to make them play an active role in the combustion, it is then preferable to provide them at a higher level, in the vicinity of the plane where the injectors 6 lie: provision may be made to place them in this case either in the bracing region, or by "replacing" a certain number of fuel injectors (6) with oxygen lances.

The total delivery of oxygen supplied by the stream of air 5 and the lances 9 is adjusted so as to be close to, and even less than the minimum required for stoichiometric combustion.

Figure 3:
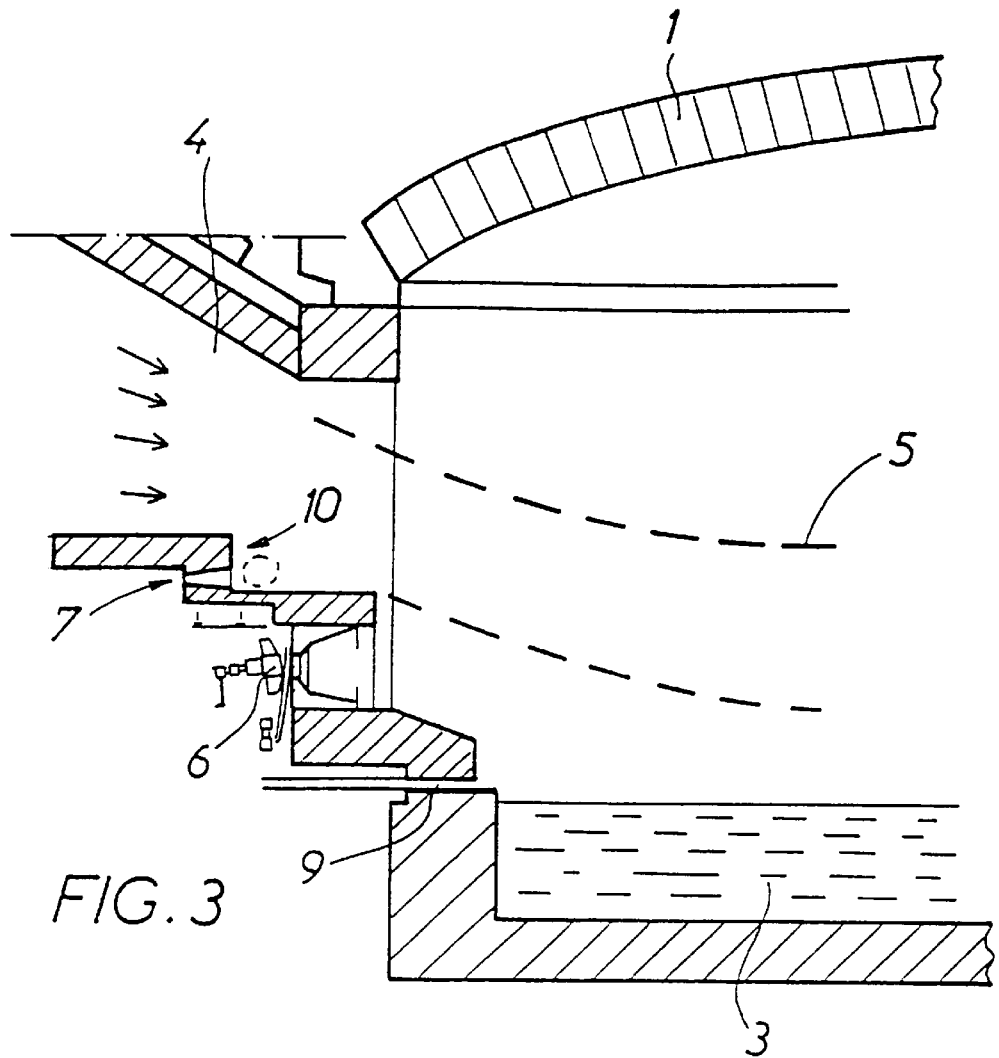
FIG. 3: an alternative embodiment of the furnace shown in FIG. 1.
Figure 4:
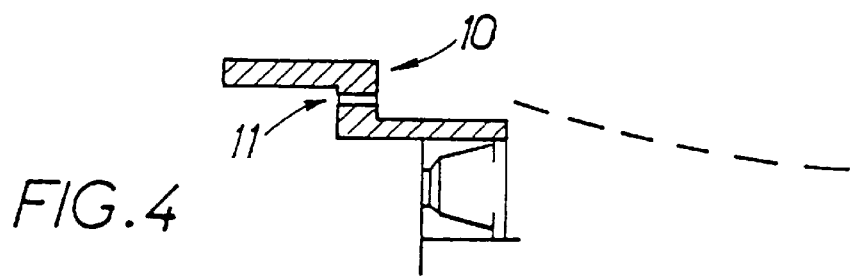
FIGS. 4 and 5: partial views of alternative embodiments of the vertical step in the burner flue.

In the alternative embodiment of staged combustion, illustrated in FIG. 3, the side injectors 7 are placed on the vertical part of a step 10 in the burner flue and consequently "sheltered" from the stream of air 5. They may be arranged so as to emit fuel in a direction close to that of the fuel output by the intermediate injectors 6. They may be arranged in a perpendicular direction, as shown by the dotted lines, but always above the plane in which the injectors 6 lie. The side injectors 7 may be placed in the front part of the step 10, as shown, or, as a variant (not shown), on the side parts of the said step. The combustion is then delayed and the temperature at the root of the flame is decreased. As in the previous case, the injectors may be in a position so as to converge towards the axis of the furnace. FIG. 4 shows the same configuration as FIG. 3, but on the vertical part of the step 10 there are, instead of the gas injectors 7, nozzles 11 for injecting a buffer gas such as $CO_2$, the purpose of which is to delay the air/fuel mixing and therefore to be conducive to lowering the temperature at the flame roots.

Figure 5:
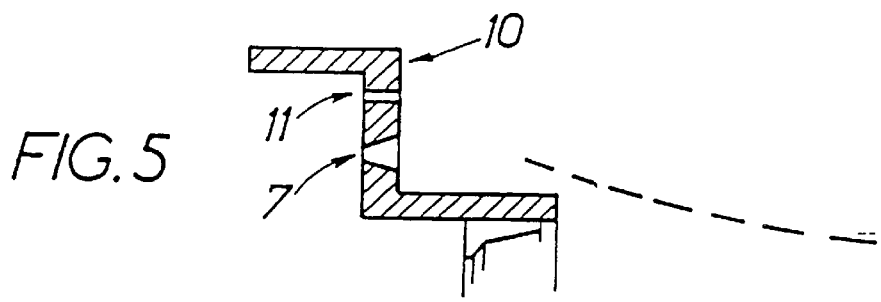

FIG. 5 shows yet another configuration in which the staged combustion and buffer-gas injection are combined. Thus, on the vertical part of the step 10 there are the buffer-gas injection nozzles 11 and, underneath, the fuel-gas injectors 7.

The buffer gas is injected by the nozzles 11 at a velocity close to that of the fuel if the fuel injectors are oriented so as to be parallel to the buffer-gas nozzles. According to an alternative embodiment, not shown, this buffer gas could be injected by an annular tube directly around each fuel injector.

In all the cases shown, injection of oxygen by the lances 9 makes it possible to reduce the upward inclination of the fuel injectors, without running the risk of having a reducing atmosphere close to the flame roots.

The furnace described above for a staged-combustion device therefore makes it possible to combine several primary measures which reduce the $NO_x$ emitted under the best conditions and without the risk of having a reducing combustion prejudicial to the tint of the glass.

The method and the device according to the invention are particularly suited to the manufacture of high-quality glass, in particular flat glass using the float process.

What is claimed is:

1. A method of combustion for melting glass, comprising:
   feeding a combustion gas into a furnace having molten glass therein via a combustion gas intake port;
   feeding a fuel into said furnace at a position below the combustion gas intake port, and permitting the combustion gas and fuel to mix, to combust the fuel in the furnace; and
   injecting a non-combustible buffer gas into the furnace at a position between the combustion gas and the fuel to delay the mixing of the combustion gas and fuel.

2. A furnace for melting glass, comprising:
   a combustion gas intake port positioned for feeding a combustion gas into a furnace having molten glass therein;
   at least one fuel injector positioned below the combustion gas intake port, to permit the combustion gas and fuel to mix to combust the fuel in the furnace; and
   a buffer gas port positioned between the at least one fuel injector and the combustion gas intake port for injecting a non-combustible buffer gas into the furnace at a position such as to delay the mixing of the combustion gas and fuel.

3. The furnace of claim 2, further comprising a further fuel injector positioned above the at least one fuel injector and below the combustion gas intake port.

4. The furnace of claim 2, further comprising a further fuel injector positioned on a vertical step of the furnace, above the at least one fuel injector and sheltered from a flow of the combustion gas from the combustion gas intake port.

5. The furnace of claim 4 wherein said at least one fuel injector and said further fuel injector are oriented so as to provide substantially parallel flows of fuel.

6. The furnace of claim 4 wherein said further fuel injector is oriented so as to supply a flow of fuel which is substantially perpendicular to a flow of fuel from said at least one fuel injector.

7. Furnace according to claim 2, wherein the buffer gas is one of $CO_2$ and an inert gas emanating from the recycling of smoke/gaseous effluents discharged from the furnace.

8. Furnace according to claim 2, wherein the at least one fuel injector projects fuel at a velocity at least 3 times greater than the velocities of the gases projected by the buffer gas port.

9. Furnace according to claim 2 further comprising at least one oxygen lance or further air intake.

10. Furnace according to claim 9, wherein a plurality of oxygen lances are arranged substantially at the same level as the at least one fuel injector, wherein the lances and at least one fuel injector alternate on the same level.

11. Furnace according to claim 9, wherein the combustion gas por provides a substoichiometric flow of oxygen.

12. Furnace according to claim 2, further comprising at least one oxygen lance or air intake in the vicinity of the surface of the molten glass.

13. Furnace according to claim 9, further comprising side air intakes or oxygen lances, the number of which increases in a direction away from said at least one fuel injector.

14. Furnace according to claim 2, having axial symmetry.

15. Furnace according to claim 3, wherein the buffer gas port is positioned in a side wall of the air intake port and is oriented to direct a flow of the buffer gas towards an axis of the at least one fuel injector.

16. Furnace according to claim 4, wherein the buffer gas port is positioned in a side wall of the air intake port and is oriented to direct a flow of the buffer gas towards an axis of the at least one fuel injector.

17. Furnace according to claim 3, wherein the at least one fuel injector projects fuel at a velocity at least 3 times greater than the velocities of the gases projected by the buffer gas port.

18. Furnace according to claim 4, wherein the at least one fuel injector projects fuel at a velocity at least 3 times greater than the velocities of the bases projected by the buffer gas port.

* * * * *